United States Patent [19]
Wedemeyer

[11] Patent Number: 5,175,958
[45] Date of Patent: Jan. 5, 1993

[54] SNAIL PUB, A SNAIL COLLECTION SYSTEM; THE ONE-WAY SNAIL GATE; AND THE SNAIL PEN, A SNAIL TRAP

[76] Inventor: Lowell R. Wedemeyer, 3002 Catalina Dr., Davis, Calif. 95616

[21] Appl. No.: 20,381

[22] Filed: Mar. 2, 1987

Related U.S. Application Data

[63] Continuation-in-part of Ser. No. 803,081, Nov. 27, 1985, abandoned, and a continuation-in-part of Ser. No. 728,796, Apr. 30, 1985, abandoned.

[51] Int. Cl.⁵ .............................................. A01M 1/10
[52] U.S. Cl. ....................................... 43/121; 43/107
[58] Field of Search .................. 43/107, 108, 109, 111, 43/121, 123, 69, 70

[56] References Cited

U.S. PATENT DOCUMENTS

1,128,946  2/1915  Blum ..................................... 43/121

Primary Examiner—Kurt Rowan

[57] ABSTRACT

The ONE-WAY SNAIL GATE invention permits a snail or slug to cross in one direction but not the reverse. Thin wires suspend the ONE-WAY GATE in functional position without providing an escape surface to the snails. The SNAIL PEN is a trap formed of at least one ONE-WAY GATE and one or more isolation or barrier devices. The SNAIL PUB is a complete system for collecting live snails formed of the SNAIL PEN trap and the SNAIL COCKTAIL attractant, an actively growing yeast cultured in an aqueous sugar solution. The SNAIL SPIKE MATRIX barrier is a suspended, downward-facing matrix of points with gaps between the points that deprives a snail's foot of gripping surface from which to suspend the snail's weight if it attempts to traverse the underside of the matrix. The SNAIL WHEEL is a barrier formed of one or more disks rotatably mounted on an axle which will rotate downward bearing the snail to the lowest point on the disk, and thereafter rotate counter to the snail's effort to climb back. The SNAIL SALT STRIP barrier is a waterproof substrate, adapted for garden and agricultural environments, whose underside is coated with a water-soluble salt exposed to contact traversing snails.

24 Claims, 5 Drawing Sheets

SNAIL PUB, A SNAIL COLLECTION SYSTEM; THE ONE-WAY SNAIL GATE; AND THE SNAIL PEN, A SNAIL TRAP

RELATED APPLICATIONS

This application is a C-I-P of application Ser. No. 06/803,081 filed Nov. 27, 1985, and upon the original application of the same inventor, Lowell R. Wedemeyer for the One-Way Snail Gate, application Ser. No. 06/728,796, filed Apr. 30, 1985 both now abandoned.

BACKGROUND OF THE INVENTION

1. Field of the Invention

The field of the invention is traps and barriers for snails. The original application Ser. No. 06/728,796 for the One-Way Snail Gate and the C-I-P application Ser. No. 06/803,081 were assigned to Group Art Unit 325 now abandoned.

2. Description of Related Art, Including Information Disclosed Under Sections 1.97-1.99

This invention relates to a one-way gate for gastropods, including snails and slugs, and for other creatures which use means of crawling locomotion similar to gastropodan locomotion, but do not hop or fly. The primary use conceived for the one-way snail gate device is in trapping such creatures to eliminate them from gardening and agricultural areas, though it also has applications in controlling, sizing and sorting such creatures. So far as I am aware, there presently is no simple, inexpensive, effective, non-poisonous, mechanical device for trapping snails and slugs. Instead, snails and slugs are eliminated either by laborious hand-picking or by use of various poisons, frequently containing arsenic, metaldehyde, methiocarb, Mesurol (Registered Trade Mark), or carbamate compounds.

A non-poisonous system for collection of such creatures is a desirable alternative to the poisons and other methods now employed. It is desirable that the system remain functional notwithstanding wetting from rain or automatic watering systems.

The lack of a non-poisonous, mechanical trap for such creatures apparently is due to the difficulty that has been experienced in devising a gate, adapted to gastropodan means of locomotion, which such crawling creatures can pass through to enter the trap, but not pass through in the reverse direction to exit the trap.

Ibach, U.S. Pat. No. 3,550,308, and Lindley, U.S. Pat. No. 4,251,946, among others, describe devices which have unrestricted openings through or under which a snail or slug can enter and from which the creature could exit. The snails and slugs then must either be physically picked up or disabled by poison before they depart.

It is an objective of the Snail Gate and Snail Pen inventions to allow entry of snails and slugs, but to mechanically prevent their subsequent exit without need to poison or pick up the creatures to prevent their departure.

Related Art Concerning Snail Barriers

Clean, metallic copper is noxious to snails on contact and has been used as a barrier to snails.

Elmslie describes large barriers of galvanized steel buried to a depth of 40 cm in the ground and extending 50 cm above ground, interior barriers of specially manufactured plastic netting employing double flaps, and electrified wire barriers, all said to be used in snail farming.

These all are two-way barriers, as distinguished from my one-way gate device through which snails can pass in one direction but not the other.

Judd, U.S. Pat. No. 4,319,423 and Moens, et al., describe barriers of copper or galvanized screen, or zinc sheets, with the top bent into an inverted "u" shape wherein a depending lip is designed to impede passage of snails or slugs. The effectiveness of the lip is dependent upon a critical relationship between the lip dimensions and the size of the creatures to be barred, and the lip can be bridged by one snail climbing upon another. An objective of my barrier inventions is to avoid the criticality of the lip dimensions and to avoid the risk of bridging of the barrier in the face of a heavy traffic of snails, as would be experienced in a heavily loaded snail trap.

Published literature discloses various gastropod aversive substances which can be spread on the ground to serve as barriers to snails, including ashes, ammonium sulfate, sand, lime and sodium chloride (ordinary table salt). The effectiveness of these barriers is impaired by leaching or dispersal by wind. They all are amorphous powders, granules or crystals which must somehow be physically controlled but retain an exposed surface to serve as barriers in an easily portable trap. The widths, volumes and weights of these materials needed to assure a barrier to a large number of snails confined in the small volume of a trap are disadvantageous and pose difficult design problems.

It is an objective of my inventions to incorporate such gastropod aversive substances into functional, controlled snail barriers suitable for use in an easily portable, inexpensive, small trap.

Related Art Concerning Snail Attractants

Snails are considered to be both pests and a food source. An objective of the within invention is the creation of a snail collection system which can be used to remove snail pests from garden and agricultural areas without the necessity to use poisons and which also can be used to collect live snails for use as food. Such a system requires a non-poisonous attractant which attracts snails over a sufficiently great distance to efficiently lure a substantial number of snails into a trap in a relatively short period of time, e.g., overnight.

Metaldehyde, perhaps the most widely used snail attractant, is poisonous to mammals and birds as well as to snails and slugs.

Lindley, U.S. Pat. No. 4,251,946, discloses use of a yeast and sugar mixture, activated by water, as a snail attractant in combination with poisons and a trap. Pastac, U.S. Pat. No. 3,090,723 discloses use of yeast and other cryptogams in combination with poisons as snail bait.

It is an objective of my Snail Pub invention to lure snails and slugs into the trap without use of poisonous attractants, and to hold them without need to poison or to hand-pick them to prevent their departure.

SUMMARY OF THE INVENTION

Summary of One-Way Snail Gate and Trap

The inventions are a One-Way Gate for use with snails, and the Snail Pen trap which incorporates the One-Way Gate. I anticipate that it also will be useful with other gastropods, such as slugs, and with other crawling creatures such as caterpillars which are capable of locomotion by shifting their body weight between a forebody grip and a hind body grip, but are incapable of hopping, striding or flying. The One-Way Gate permits such creatures to pass in one direction across the one-way snail gate but prevents them from passing in the reverse direction. The one-way gate is suspended in space by filaments too thin to afford the snails an adequate gripping surface on which they might crawl away after crossing the one-way gate. The one-way gate invention enables the making of simple, inexpensive, effective, non-poisonous, mechanical traps for such crawling creatures. In addition, the one-way gate has other applications in the containment and control of such creatures in captive environments, such as for sorting and separating such creatures by size or weight.

Snails' Technique for Crossing Gaps

The one-way gate invention exploits an observed behavior of snails in which they move across a discontinuity between two adjacent but unconnected surfaces, such as, for example, two adjacent plant leaves. The snail establishes a position with its mid- and hind-body at the edge of a first or access surface, from which the snail reaches its forebody across the discontinuity to establish a forebody grip on a second or target surface. Once the forebody grip on the target surface is established the snail tensions its body to stabilize the access and target surfaces relative to each other, and also to obtain the leverage within its body to move its fore- and mid-body, including the shell, across the discontinuity. The snail then shifts its weight within its body from the hindbody grip to the forebody grip across the discontinuity. During this weight shift the snail progressively retracts and thickens its forebody relative to its shell, thereby consolidating its midbody gripping parts into the previously-established forebody grip on the target surface. The snail progressively extends and thins its hindbody relative to its shell to progressively diminish its stabilizing, hindbody grip on the access surface. When the snail has shifted the bulk of its weight from the hindbody grip across the discontinuity to the forebody grip on the target surface the snail releases its hindbody grip on the access surface, thereby terminating the snail's stabilization of the discontinuity between the access an target surfaces.

Typically, if there is a substantial gap between the target surface and the access surface, then immediately after the snail's release of its hindbody grip on the access surface, the snail's gripping power is substantially impaired. This is because a substantial fraction of the snail's hindbody gripping surface is not adhered to any surface but rather is dangling from the snail's forebody grip on the target surface. Nonetheless, a snail can ride its forebody grip on the target surface through a drop of several centimeters after the snail releases its hindbody grip on the access surface. If the snail's forebody grip survives the deceleration at the end of the drop, the snail then uses its forebody grip to pull its hindbody onto the target surface.

Mode of Action of the One-Way Gate

My one-way gate invention employs the shift in the snail's own weight from the access surface to the target surface, and the snail's release of its stabilizing hindbody grip on the access surface, to extend the size of the gap or discontinuity between the access and target surfaces beyond the maximum reach of the snail's forebody. This prevents a return by the creature across the resulting extended gap in the reverse direction. If the snail's forebody grip on the target surface is adequate to sustain the snail's weight when the snail releases its hindbody grip on the access surface, the snail will simply remain adhered to the target surface and ride it away from the access surface as the gap increases. If the snail's other means of exit from the target surface are barred or bottled up, then when the snail crosses the one-way gate it is trapped.

Suspension Filaments

Filaments or wires having a smaller diameter than the snails can grip to climb or cross are employed in the invention to suspend the target surface in space, thereby effectively denying the snail any escape surface on which it can crawl off the trap after it crosses into the trap through the one-way gate.

Suspension filaments of larger diameter on which a snail can obtain a grip, but having a snail-repellent copper surface, will discourage escape of the snails along such larger filaments. A copper tube of approximately ⅛ inch (0.3175 cm diameter) has displayed this function. The snail will exude excessive foot mucus and fall off the curved surface of the tube even if the copper tube's longitudinal dimension is horizontal, and thus the tube can be employed as a barrier.

Figure 1:
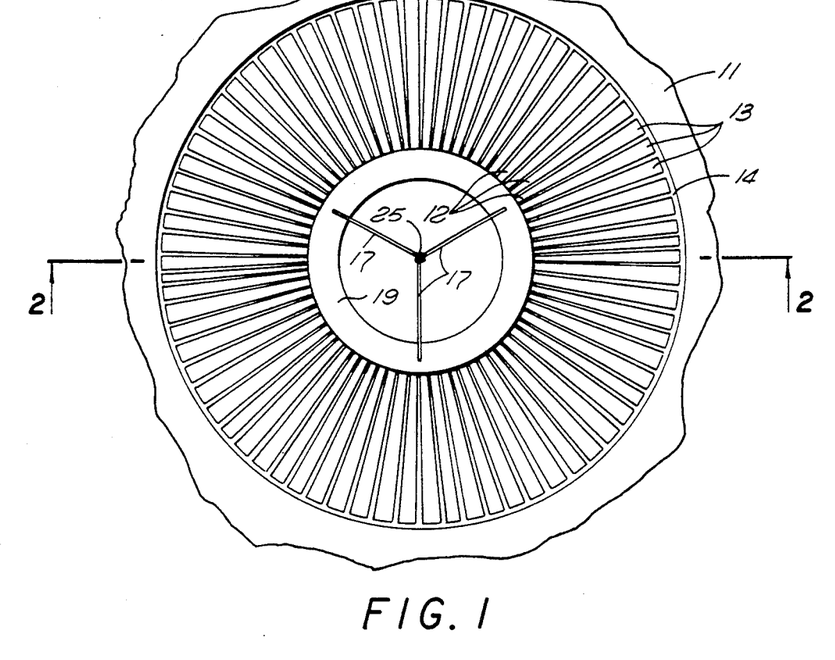
FIG. 1 is a plan view of the First Embodiment of the ONE-WAY SNAIL GATE and the SNAIL PEN.
Figure 2:
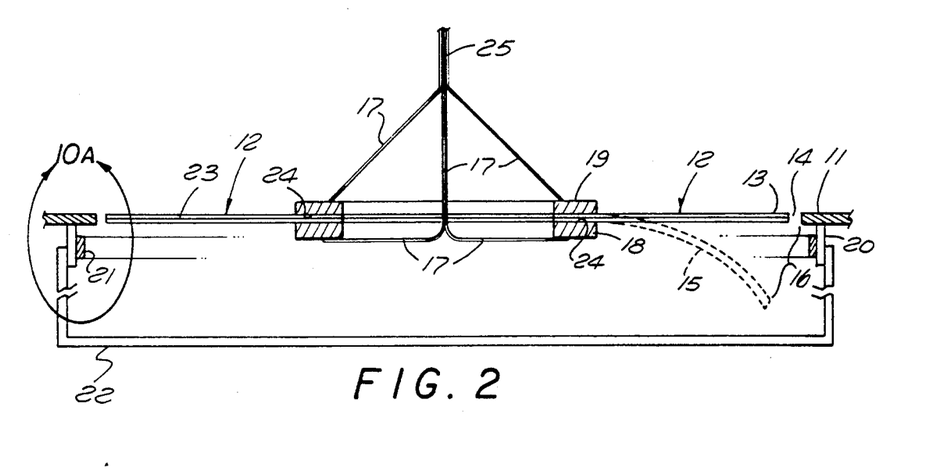
FIG. 2 is a cross-sectional elevation view of the First Embodiment along line 2—2 drawn on FIG. 1.

In the First Embodiment of the One-Way Snail Gate, FIGS. 1 and 2, the fingers and support structure are isolated by suspending them in space from one or more filaments. The suspension filaments 17 are selected to have sufficient strength to bear the weight of the fingers plus the weight of any bait or other attractant matter and the weight of captured creatures. The filament also is selected to have sufficiently small diameter that the captured snails will be unable to obtain a grip on it to climb up the filament and escape from the target surface. Number 24 AWG size wire is of sufficiently small diameter to deny all but the smallest of snails an adequate gripping surface and discourage escape along the filaments. If the wire surface is copper, it will repel snails and though they may initially adhere to it for a brief period they will release their grip and simply drop off it. Galvanized wire provides a similar but less pronounced effect.

Refinements for Dislodging Snails from the Gate

Immediately after the release of the hindbody grip on the access surface, and before the snail has consolidated its hindbody gripping parts into the previously-established forebody grip on the target surface, the snail is in a position of lowered gripping power, and vulnerability to being dislodged from its forebody grip. My snail-dislodging refinements to the invention exploit this impaired grip.

According to my conception, larger snails could be dislodged and smaller snails left adhered to the target surface by reducing the initial gap between the target and access surfaces to permit smaller snails to obtain a forebody grip and by making the target surface substantially more narrow in its longitudinal dimension than the width of the foot of the larger snails. The dislodging of the larger snails from the target surface could be further improved by positioning a set of teeth near the end of the curve through which the target surface passes as it drops away from the access surface bearing the larger snails, so that the target surface bearing the snail nearly grazes the teeth as it passes through them.

Those snails which are wider than the target surface will be dislodged by impact upon the edges of the teeth as the target surface passes through the teeth.

As a further alternative, the tip of the finger bearing the target surface could be forked or perforated so that a projecting member which is positioned near the end of the downward curve described by the target surface's motion under the weight of the snail will project between the forks or through the perforation in the finger tip at the point on said curve of maximum velocity of the finger tip. This will cause the foot of the snail, even a small snail, to impact on the projection and dislodge the snail.

I further conceive that the forebody grip of the snail on the target surface could be further impaired by ridges or gaps in the surface which prevent the snail from establishing a continuous interface between its forebody gripping parts and the target surface.

The grip of the snail on the target surface can be further impaired if the snail is caused to pass through a foot bath of water immediately before it reaches from the access surface to grip the target surface. My conception is that this foot bath, a centimeter deep more or less, can encircle the access surface, placed so that the snails traverse the bath on the way to the access points.

Use of the One-Way Gate for Sorting

One of my conceptions is that the invention can be employed for sorting the creatures by size. This could be done by setting one-way gates in a series of one or more, progressively increasing the size of the initial gap in each gate of the series. Only creatures of progressively larger minimum sizes could reach across the progressively larger initial gaps to establish the firm grip on the target surface which is necessary to execute the maneuver cross the gap.

Sizing selection amongst the snails which are large enough to establish a forebody grip across the initial gap can be achieved by use of the snail-dislodging refinements of the invention. This will occur because the larger of such snails will be able to establish a sufficient forebody grip to hold onto the target surface and survive an abrupt deceleration of the target surface at the end point of the target surface's drop away from the access surface upon release of the snail's hindbody grip on the access surface. However, the intermediate snails will have stretched and extended themselves so far out across the gap between the access surface and target surface to establish a relatively weak forebody grip on the access surface such that a major fraction of their bodies may be dangling from the forebody grip and their forebody grips cannot survive the rapid deceleration of the target surface at the end of its downward curve and they fall off the target surface. The smallest snails will be unable to reach across the initial gap. Thus, the larger snails will be adhered to the target surface, the intermediate snails will be dropped onto any surface below, and the smallest snails will remain on the access surface.

The sizing of the snails thus selected could be controlled by adjusting the initial gap between the target and access surfaces, further controlled by adjusting the mechanical properties of the target surface to adjust the acceleration and deceleration of the target surface, and further controlled by adjusting the "slickness" or adherence coefficient of the target surface relative to the snail's foot, balancing that "slickness" against the minimum grippability necessary to induce a snail to cross the one-way gate.

SUMMARY OF SNAIL BARRIER INVENTIONS

The Snail Spike Matrix

I have invented a snail barrier comprising a depending fringe of filaments, the bottom tips of which form a downward facing matrix of points. The filament tips in the matrix are spaced with gaps between them too small for a snail's foot to pass through to grip the sides of filaments, but wide enough that the snail's foot cannot obtain a sufficiently continuous grip on the matrix to suspend the snail's weight from the face of the matrix and traverse it. If a snail does obtain a partial grip on the matrix, the snail's foot will contact only the points in the matrix and substantial portions of the foot which cover the gaps between the points will be exposed. Even if the snail can hold on initially, atmospheric drying of its foot mucus will induce the snail to withdraw from or drop off the matrix. The matrix should be wider than a snail can reach across so that a snail cannot bridge the matrix by reaching from a hindbody grip on the near side of the matrix to obtain a forebody grip on another surface on the far side of the matrix. The SNAIL SPIKE MATRIX barrier solves a problem in which numerous snails may wholly or partially bridge or clog a barrier and some snails may escape by climbing upon and over their fellows to bypass the barrier. Where my downward facing matrix is used the additional weight of a second snail climbing on a first snail which has partially bridged the matrix will further assure failure of the grip of the first snail on the matrix thereby making both snails more likely to fall off the matrix. Thus, the heavier the traffic on the downward facing SNAIL SPIKE MATRIX, the better it will function.

The SNAIL WHEEL Barrier

I have invented another form of snail barrier comprising one or more disks rotatably mounted on an axle such that the circumferential surface of the disk will present a gripping surface to snails which approach the barrier. The invention utilizes a blocking member to prevent the snails from crawling over the top or around the sides of the disks. When a snail grips and shifts its weight to a disk the disk rotates carrying the snail to the lowest point on the circumference of the disk. The disk thereafter will rotate counter to efforts of the snail to crawl up the circumference of the disk.

This device is refined by methods designed to impair the grip of snails on the circumferential surface of the disks.

In the first refinement, the disks are made narrow and are closely spaced so that a snail will grip the circumferential surface of two or more disks. Owing to the shape of snails, a snail's weight will tend to be more heavily concentrated on one disk than on adjacent disks which also are gripped by the snail. The differentially weighted disks will tend to rotate downward at different speeds, thereby placing a torque across the grip of the snail's foot, impairing that grip and increasing the likelihood that the snail will drop off the barrier. In the second refinement, a matrix of points is placed on the circumference of the disk to deprive the snail's foot of a continuous gripping contact with the circumferential surface of the disk, and exposing substantial portions of the snail's foot to the atmosphere, thereby impairing the snail's grip on the disk.

The two refinements can be utilized together to greatly increase the likelihood that snails will drop off the barrier and not clog or bridge it.

The SNAIL SALT STRIP barrier

I have devised an inexpensive snail barrier for use in a small, portable trap, or elsewhere, by adhering crystals of a gastropod aversive salt to the inner walls or ceiling of the trap so that a snail attempting to crawl on those surfaces will contact the salt and avoid those surfaces. The salts are highly water-soluble, but can be adhered on inner surfaces of the trap where they are substantially protected from rain and irrigation water. The salt can be sodium chloride (ordinary table salt), calcium sulfate, or iron sulfates. I anticipate that other snail repellent substances also will work, and in particular, that water-soluble, ionic, inorganic salts as a class will work. Excessive contact with the salts will harm or kill the snails, but they quickly withdraw from touching the salts and normally will not voluntarily remain in contact with the salts for a sufficient time to injure themselves. Sodium chloride in the small amounts which are adhered to a trap poses relatively little danger to humans, other animals, birds, or the environment. Iron sulfates are a common agricultural soil additive, and pose little if any environmental risk in the amounts used in a trap. They are used in therapeutic doses in humans, but cause severe poisoning if ingested in excessive amounts.

Mode of Making and Use of the SNAIL COCKTAIL Attractant

Yeast, when actively growing in an aqueous solution which said yeast is adapted to dissimilate, is attractive to snails over a sufficient distance to lure snails across a one-way gate into a trap. I call this growing yeast solution a SNAIL COCKTAIL. The yeast and sugar solutions comprising the SNAIL COCKTAIL are made from common food ingredients used in making bread or fermented drinks and therefore are non-hazardous to humans, other mammals and birds.

Ingredients for the SNAIL COCKTAIL, such as table sugar and active dry yeast, can be packaged, stored and delivered dry, with water to be added at the time and place of use. Alternately, sugar-based syrups, or other concentrated sugar-containing solutions, such as malt extract could be packaged in small individual water-impermeable packages, accompanied by a suitable yeast in separate packets, with the ingredients to be mixed and water to be added at the time and place of use.

Malt extract sold commercially for home brewing of beer, inoculated with a pinch of brewers' yeast, successfully attracted snails across the one-way gate into the trap and has proved to be the most attractive cultured yeast solution thus far tried.

Snails also were successfully attracted into the trap with an aqueous solution of sucrose (C&H brand cane table sugar) in combination with active dry bakers' yeast (Fleischmann's brand, of Nabisco Brands, Inc.).

I anticipate that the yeast can be any of the common domesticated yeasts, or their wild cousins, each matched with an appropriate culture medium, for example, distillers' or brewers' yeast with malt extract or other grain sugar, vintners' yeast with grape or other fruit sugar, and bakers' yeast, such as active dry yeast, with cane or beet sugar.

Excellent attraction of snails has been achieved with aqueous sugar concentrations in the same ranges as are used for home brewing of wine and beer (approximately 15% sugar by weight, more or less, measured by Brix or balling methods), with a pinch of yeast between thumb and forefinger added to approximately one half cup (100 to 125 ml.) of the warm sugar solution and exposed to the snails in a shallow cup or dish after 2-6 hours, more or less, of dissimilation exposed to the atmosphere.

Some of the attracted snails fell or climbed into the solution and drowned, but a simple wire screen over the container prevented this. Rain and automatic water sprinkling diluted and washed away the SNAIL COCKTAIL solution, but a roof over the solution will avoid excessive dilution.

The Snail Pub

The SNAIL PUB is comprised of the SNAIL PEN, utilizing the ONE-WAY SNAIL GATE and at least one snail barrier, together with a bait such as the SNAIL COCKTAIL. The SNAIL PUB, when utilizing the fermenting sugar solution, constitutes a complete system for non-poisonous collection of live snails.

BRIEF DESCRIPTION OF THE DRAWINGS

The drawings in this Divisional and Continuing-in-Part Application consist of Figures and Details 1 through 17, inclusive on drawing Sheets 1/7 through 7/7.

FIG. 3 also shows snail dislodging devices.

DETAILED DESCRIPTION OF DRAWINGS

First Embodiment of the One-Way Snail Gate, the Suspension, and the Snail Pen FIG. 1 is a plan view of the First Embodiment of the one-way snail gate. It shows an access surface 11 surrounding a series of cantilevered members or fingers 12, radiating outward from annular retainer piece 19 which stabilizes the fingers 12, and holds the target surface 13 at the tips of fingers 12 adjacent to the access surface 11. This forms an initial minimum gap or discontinuity 14 between the access surface and the target surface. The initial minimum gap must not be greater than the reach of a forebody grip of the smallest snail which is to be able to cross. The size of this initial minimum gap 14 should be approximately the dimension of such smallest snail's shell measured along the longitude of the snail's body. The annular retainer 19 and fingers 12 are suspended from stiff filaments 17 which are gathered in a central bundle 25 to increase the ability of the suspension system to resist excessive sway that would alter the gap 14 between the access and target surfaces. The suspension of the one-way gate from filaments serves as means to isolate the target surface from any other surface which the snail could use to crawl off the gate and escape.

FIG. 2 is a cross-sectional elevation view of the First Embodiment along line 2—2 drawn on FIG. 1. It shows the access surface 11 adjacent to the target surface 13 at the tip of finger 2, which is cantilevered from annular retainer 19 and annular support piece 18, and suspended from stiff filaments 17. Dotted lines 15 outline the finger 12 in a depressed position as it would appear under the weight of a snail that had just shifted its weight to the target surface 13, released its hindbody grip on the access surface 11, and ridden the target surface on the downward curve as finger 12 flexed under the snail's weight, thereby extending the initial minimum gap 14 into the extended gap 16.

Figure 8:
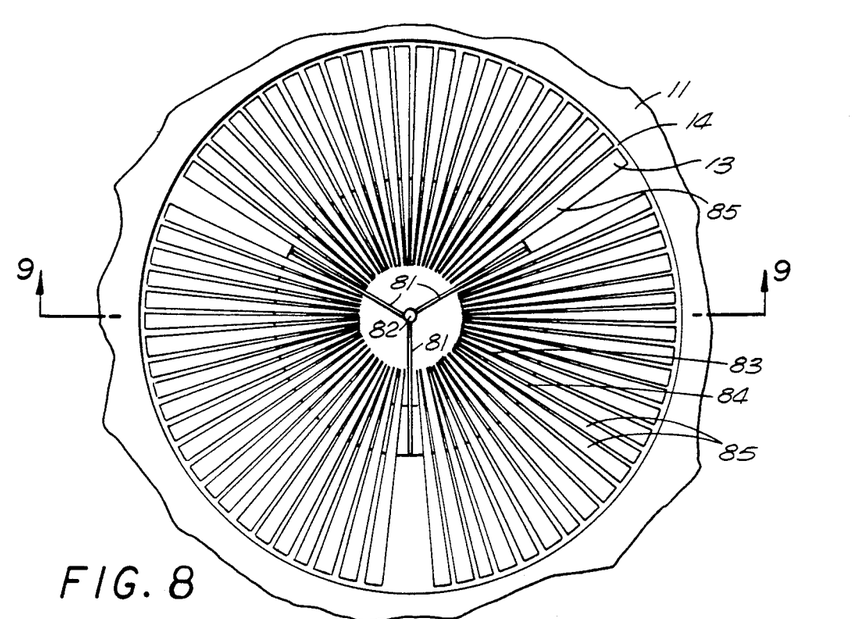
FIG. 8 is a plan view of a Third Embodiment of the ONE-WAY SNAIL GATE and SNAIL PEN.

FIG. 2 also shows a system for collecting captured snails beneath the one-way snail gate comprising a container 22 which fits snugly around retainer rim 20 which is attached underneath access surface 11. Snails which drop or are brushed off fingers 12 into container 22 are inhibited from crawling up the side of the container and out through gap 14 (or, more likely, through extended gap 16 when finger 12 is depressed under the weight of another snail) by the snail-repellent strip 21. If gap 14 is sufficiently small, and stopping means, similar to the stopping means 83 in FIG. 8, are placed over the flexible fingers 12 to prevent the fingers from flexing upward past the access surface, the snails will not be able to crawl out through gap 14, even if the snail repellent barrier 21 is not used. A snail could escape then only if a first snail is riding a finger to open an extended gap 16 and a second snail happens to be close enough to the gap 16 to get its foot in the opening before the first snail crawls off or is dislodged from the finger and the extended gap 16 is closed again to minimum gap 14.

The resilient members or fingers 12 are formed of laminated layers 23 for resilient strength. The fingers 12 are slidably mounted in slots 24 between annular retainer 19 and annular support 18, permitting the initial minimum gap 14 between access surface 11 and target surface 13 to be adjusted. The length of the cantilevered portion of fingers 12 can also be adjusted in this fashion which will control the flexibility of the fingers, so that the tips of the longer extensions of the fingers will pass through longer, higher-velocity curves (such as curve 38 in FIG. 3) than will shorter fingers when accelerated under the weight of the snails. If the access surface 11 also is adjustably mounted, then the length of the cantilevered portion of the fingers and the size of the minimum gap can be adjusted independently of each other.

Second Embodiment of One-Way Gate and Snail Pen

Figure 3:
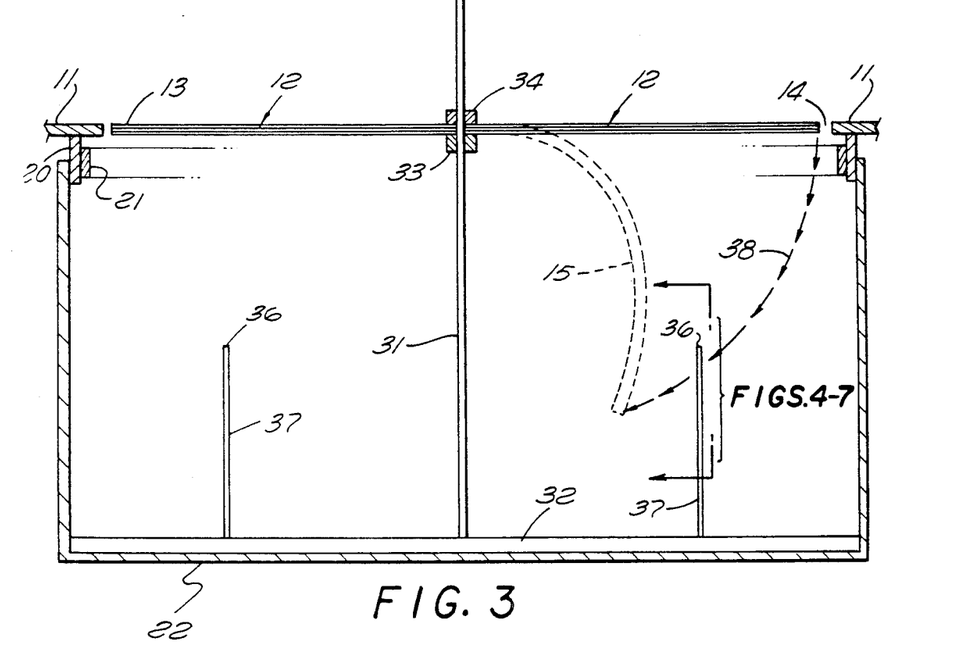
FIG. 3 is a cross-sectional elevation view of a Second embodiment of the SNAIL PEN along line 2—2 of FIG. 1, in which the isolating suspension system of the First Embodiment has been replaced by a support pedestal in the Second Embodiment.

FIG. 3 is a cross-sectional elevation view along line 2—2 of FIG. 1, except that the isolating suspension system, comprised of filaments 17, 25, the annular retainer 19, and annular support 8, has been replaced by a support pedestal 31 bearing support ring 33 and retainer ring 34 between which the butt ends of fingers 12 are fixed. Support pedestal 31 also bears an optional umbrella 35 to shade the fingers 12 from direct sunlight. Support pedestal 31 is fixed in base 32 which rests on the bottom of container 22 and fits snugly against the sides of container to establish and stabilize the minimum gap 14 between access surface 11 and target surface 13. The snail repellent barrier serves to isolate the support pedestal to complete the trapping of the snail.

Embodiments of Snail Dislodging Devices

FIG. 3 also illustrates snail-dislodging conceptions, which are further illustrated in FIGS. 4 through 7. FIG. 3 shows projections 37 rising from base 32 which project dislodging teeth 36 to intersect the curved path 38 followed by finger 12 as it is depressed under the weight of a snail to reach the ultimate depressed position of finger 12 which is reflected in dotted outline 15.

Figure 4:
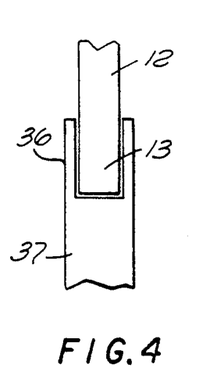
FIG. 4 is an elevation view of an embodiment of the dislodging teeth.

Detail 4 shows an elevation view of one embodiment of the dislodging teeth 36 borne on projection 37 at the point in curved path 38 where the target surface 13 at the tip of finger 12 passes through the plane of the teeth 36.

Figure 5:
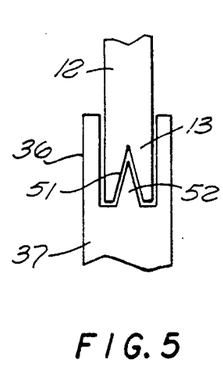
FIG. 5 is an elevation view of another embodiment of the dislodging teeth.

FIG. 5 shows an elevation view of a second embodiment of projection 37 bearing dislodging teeth 36 and also bearing a triangular dislodging tooth 52 which passes through a forked tip 51 in the target surface 13 on finger 12 and impacts the foot of the snail gripping the forked tip 51 as the snail rides the tip of finger 12 down curved path 38.

Figure 6:
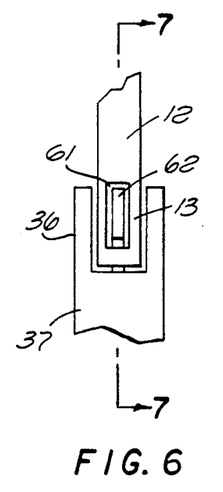
FIG. 6 is an elevation view of a third embodiment of dislodging teeth and a dislodging impact member.

FIG. 6 shows an elevation view of a third embodiment of projection 37 bearing dislodging teeth 36 and also bearing dislodging impact member 62 which passes through perforation 61 in target surface 13 and impacts the foot of the snail gripping target surface 13 as the snail rides the tip of finger 12 down the curved path 38.

Figure 7:
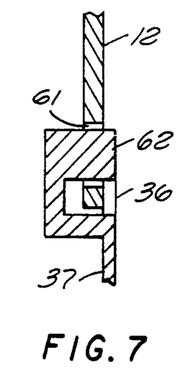
FIG. 7 shows a cross-sectional elevation view along 7—7 in FIG. 6 of the impact member.

FIG. 7 shows a cross-sectional elevation view along line 7—7 in FIG. 6 of the impact member 62 as its passes through perforation 61 in the target surface 13 of finger 12.

A Third Embodiment of The One-Way Gate In a Trap

FIG. 8 is a plan view of the Third Embodiment of the one-way snail gate. FIG. 8 shows support pedestal 82 bearing radial horizontal support members 81 on which are affixed stop ring 83 and pivot ring 84. Levers 85 each bearing a target surface 13 are arrayed in a circular pattern around pivot ring 84.

Figure 9:
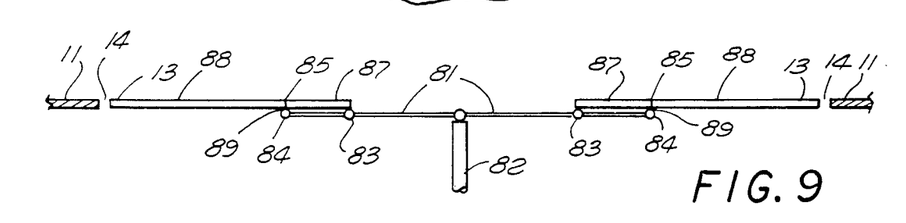
FIG. 9 is a cross-sectional elevation view of the third embodiment of the ONE-WAY SNAIL GATE along line 9—9 in FIG. 8.

FIG. 9 is a cross-sectional elevation view of the Third Embodiment of the one-way snail gate along line 9—9 in FIG. 8. FIG. 9 shows Lever 85, having greater-moment end 87 and lesser-moment end 88 and bearing target surface 13. Lever 85 is pivotally attached to pivot point 89 on pivot ring 84. When target surface 13 is unloaded the greater-moment end 87 of lever 85 rests on stopping member 83 holding the target surface 13 at the tip of the lesser-moment end 88 of the lever 85 adjacent to access surface 11 across minimum gap 14. The dotted curves 86 show the motion induced by the relative moments of the lever 85 about pivot point 89 when a snail weights the lesser moment end 88 and overbalances the greater moment end 87.

The greater downward moment of the greater-moment end of the lever thus will tend to hold the target surface adjacent to the access surface so long as the target surface is not sufficiently loaded by a snail to overbalance the greater-moment end of the lever. The relative moments of the ends of the lever about the pivot point are such that the addition of the weight of a snail to the target surface when the snail releases its hindbody grip on the access surface will cause the end of the lever bearing the target surface and the snail to pivot downward and away from the access surface, opening an extended gap.

A Fourth Embodiment, A Dual One-Way Gate

Figures 10, 10A:
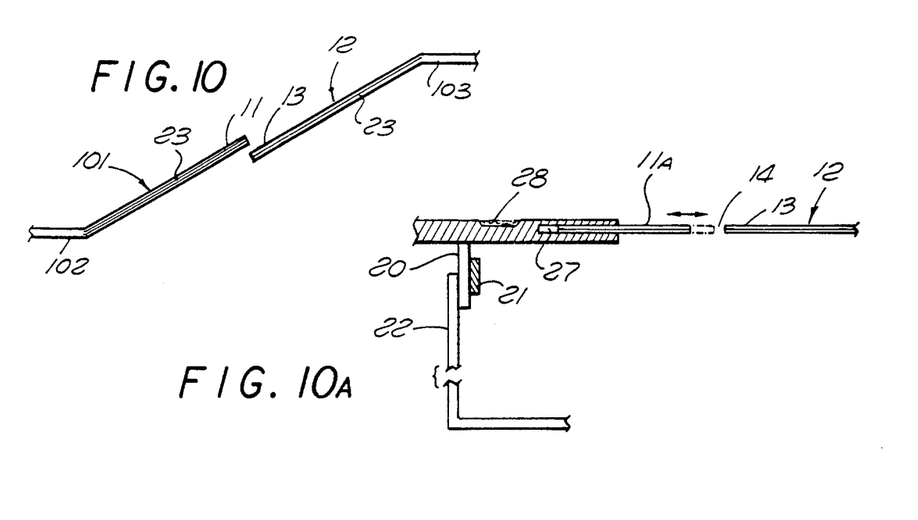
FIG. 10 is an elevation view of a Fourth Embodiment of the One-Way Snail Gate.
FIG. 10A is an elevation view in cross section of a portion of FIG. 2, as indicated by the circle thereon, showing as additional features the adjustably mounted access surface and the foot bath.

FIG. 10 is an elevation view of a Fourth Embodiment of the one-way snail gate. FIG. 10 shows resilient finger 101 formed of laminated layers 23 and bearing access surface 11 cantilevered at an upward angle from support member 102 such that access surface 11 is adjacent to and slightly above target surface 13 at the tip of finger 12 which also is formed of laminated layers and which is cantilevered at a downward angle from support member 103. In this configuration the snail on the access surface 11 depresses finger 101 into finger 12, and shifts its weight to finger 12, releasing finger 101 which flexes back up while finger 12 depresses under the snail's weight, thus amplifying the extended gap achievable with only one resilient finger.

FIG. 10A shows an adjustable access surface 11A slidably mounted in slot 27 to permit adjustment of the minimum gap 14 as indicated by the double arrow and the dotted lines. Detail 10A also shows foot bath 28, placed across the path a snail must take to the minimum gap, and designed to hold water to wet the snail's gripping parts as it approaches the minimum gap.

A Fifth Embodiment, Gate Horizontally Suspended in Trap

Figure 11:
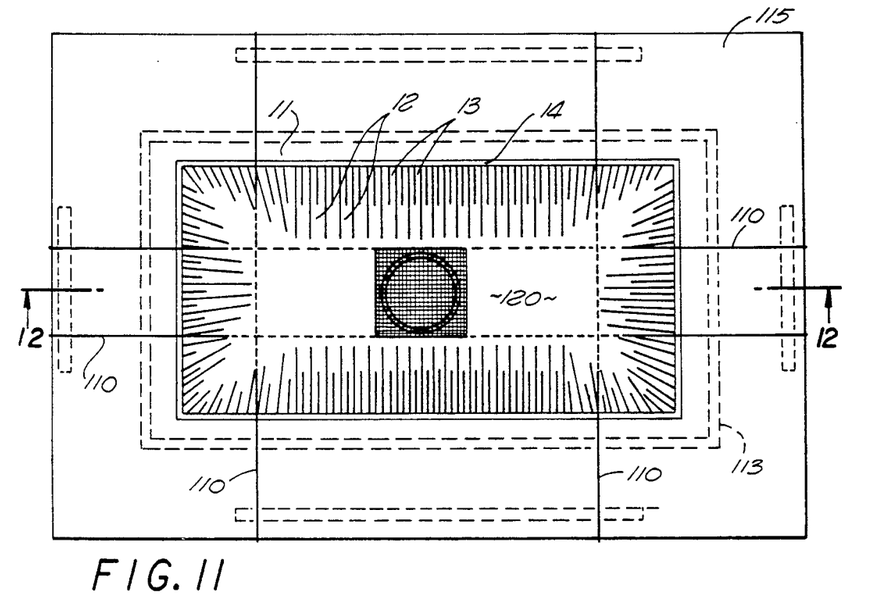
FIG. 11 is a plan view of the top of the SNAIL PEN trap, including an embodiment of the Snail SPIKE MATRIX.
Figure 12:
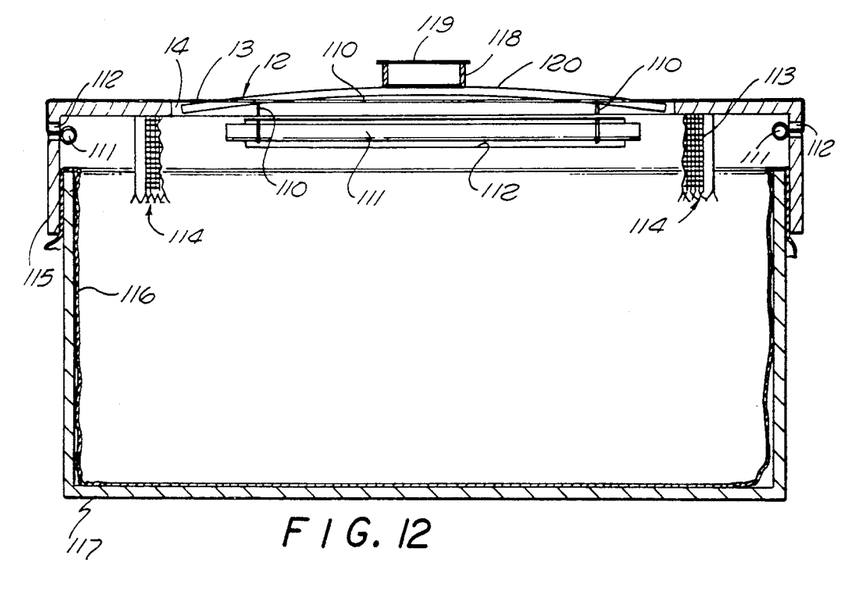
FIG. 12 is a cross-sectional elevation view of the Snail PEN along line 12—12 in FIG. 11.

Drawing Sheet 5/6 bears FIGS. 11 and 12 which depict a Fifth Embodiment of the ONE-WAY GATE in a SNAIL PEN trap. FIG. 11 is a plan view of the removable top 115 of the SNAIL PEN. FIG. 12 is a cross-sectional elevation view of the SNAIL PEN along line 12—12 in FIG. 11.

In FIGS. 11 and 12 the suspension system, used to simultaneously support and isolate the fingers and bait container, was formed of copper wire, 18 to 24 AWG in diameter, affixed to the sides of the box and stretched more or less horizontally across the top to provide a wire suspension frame across the opening formed by the top of the box. This embodiment dispensed entirely with the annular support ring, the overhead suspension members and the annular opening in the center of the laminated paper which are reflected in FIGS. 1, 2, 3 and 8.

FIG. 11 shows the top 115 of the SNAIL PEN which frames a central opening, the edges of which centrally framed opening are the access surface 11. The central opening in top 115 is spanned by the support filaments 110 upon which is mounted the resilient plastic-laminated paper sheet 120 into which the fingers 12 bearing the target surfaces 13 have been cut around the edges of sheet 120. The fingers 12 are formed by alternating longer and shorter cuts which has the effect of turning the tip of each large finger into two smaller fingers. This makes the tips of the fingers more responsive to the smaller snails and makes the fingers as a whole responsive to a wider range of snail sizes without being too stiff at the tip to open an adequate extended gap for smaller snails, or so weak as to fail under the weight of one or more of the larger snails.

The central opening framed by the top 115 is formed such that its edges bearing the access surface 11 form initial minimum gap 14 between said access surface and the target surfaces 13 when the sheet 12 is mounted upon the suspension filaments 110. The laminated sheet 120 is mounted on the suspension filaments 110 so that each filament lines up with a cut between two fingers 12.

FIG. 12 is a cross-sectional elevation view along line 12—12 in FIG. 11 of the SNAIL PEN. FIG. 12 shows that in mounting the sheet 120 on the suspension filaments 110, the resilient fingers are depressed just past the filaments so that the fingers adjacent to a filament will not hang up on the filament when a snail loads the fingers. Thus, the suspension filaments pass above the finger tips, through cuts between the fingers and beneath the uncut central portion of the laminated sheet 120 which rests upon and is supported by the suspension filaments. This configuration where the fingers 12 are depressed just past the suspension filaments 110 tends to anchor the sheet 120 to the suspension filaments and maintain the proper initial minimum gap 4 between the target surfaces 13 on the tips of the fingers 12 and the access surface 11 on the edge of the central opening framed in the top 115.

FIG. 12 also shows that the removable top 115 fits over the container 117 which can be lined with a disposable bag 116 the upper portions of which are draped over the top edge of the container 117 and held in place by friction between the top 115 and the container 117.

FIGS. 11 and 12 depict the suspension filaments 110 affixed at each end to anchor dowels 111. The sides of top 115 have slots 112, at least as wide as the diameter of the anchor dowels 111 but shorter in length than are the anchor dowels, such that when the anchor dowels are slipped from the outside of top 115 through slots 112 and pulled up sideways flush against the inside wall of the top 115 the dowels cannot pass sideways through the slots. A first set of two suspension filaments 110 are affixed at each end to two anchor dowels, such that the suspension filaments are parallel to each other and at right angles to the two anchor dowels. The anchor dowels bearing the two suspension filaments then are slipped into the top 115 through two slots 112 on opposite sides of the top 115 with the suspension filaments spanning the centrally framed opening in the top 115. The length of the suspension filaments 110 is chosen so that when the two dowels have been slipped into their respective slots the two suspension filaments attached to the dowels are tensioned across the centrally framed opening in the top 115. A second set of two filaments and two dowels is mounted and tensioned across the top 115 spanning the centrally framed opening in the top at right angles to the first set, thereby forming a suspension system over the centrally framed opening for the plastic-laminated sheet 120.

A Fringe Impediment

This embodiment used a cloth fringe impediment, not depicted in the drawings, hung from the underside of the access surface to screen captured snails from return on the underside of the access surface to the gap between the fingers and the access surface.

In order to negotiate the turn beneath the lower end of the depending fringe the snail must suspend its entire body weight from its foot grip on the fringe. A few snails escaped by negotiating the turn beneath the fringe and finding an extended gap, where another snail was riding a finger and holding that finger in the extended gap position, which allowed those snails to escape back onto the access surface. For many purposes, the fringe impediment will be adequate and inexpensive. It is wholly non-poisonous to humans, other animals, birds and snails, and the escape of a few snails when the trap is heavily loaded may not be too troublesome.

FIGS. 11 and 12 show a bait container 118, suitable for exposing the SNAIL COCKTAIL or other attractant, covered with a screen 119, and resting in the center of plastic-laminated sheet 120 such that snails must cross the gap 14 onto the fingers 12 in order to reach the bait. Since the feeding behavior of snails may attract other snails, the bait container 118 could be built with a lip inside the rim on which the screen 119 may rest, submerged just under the surface of the attractant solution so that snails can feed on the surface of the solution without drowning.

An Embodiment of the SNAIL SPIKE MATRIX

FIG. 12 shows two fragments of an impediment barrier 113 attached to and depending from the underside of the top 115. As showed in FIG. 12, the impediment barrier is a copper wire screen folded double, hung by the fold from the underside of the top 115. In FIG. 12 the impediment barrier has been cut away to reveal the detail of the anchor dowel and slot arrangement behind the barrier. FIG. 11 indicates by two dashed lines the placement of the impediment barrier 113 hung from the under side of the top 115 and encircling the centrally framed opening in the top. The impediment barrier is so placed to bar captured snails from crawling up the sides of container 117, across the underside of top 115 to the gap 14 where they could escape if another snail were riding a finger 12 creating an extended gap through which captured snails could crawl up around the edge of the centrally framed opening and reach the access surface. FIG. 12 shows the lower edge of the impediment barrier 113 bearing a downward facing matrix of points 114. The points in matrix 114 are the lower tips of depending wire warp filaments of the screen material left when the woof filaments have been removed from the cut edge of the screen material. The tips of the depending warp filaments are bent alternately left and right from the plane of the screen material to fix gaps between those tips thereby forming the downward facing matrix 114. The object of the matrix of points 114 is to deny a snail a continuous surface against which its foot can form an adequate grip to suspend the snail if it should attempt to cross the matrix beneath the lower edge of the impediment barrier 113.

The SNAIL WHEEL Barrier

Figure 13:
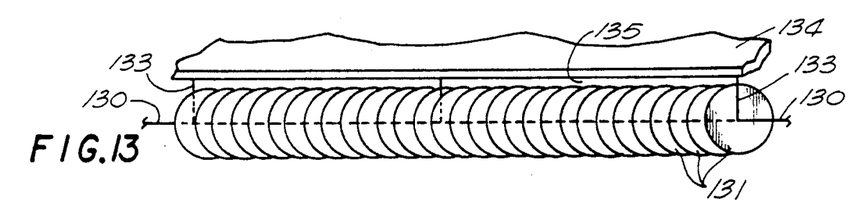
FIG. 13 is an elevation view of the SNAIL WHEEL barrier.

FIG. 13 on Drawing Sheet 6/6 shows the Snail WHEEL barrier. The SNAIL WHEEL barrier depicted in FIG. 13 could be substituted for, or employed in series with, the impediment barrier 113, which is depicted in FIGS. 11 and 12 hung from the underside of top 115 encircling the edge of the centrally framed opening in the top 115.

In FIG. 13 the disks 131 are rotatably mounted on axle 130, and hung by suspension wires 133 beneath a surface 134 with a space 135 between the top of the disks and the underside of the surface 134 more narrow than a snail can pass through. The disks are mounted side by side on the axle loosely enough that the side faces of adjacent disks can rotate past each other with minimal friction between them, but closely enough that a snail gripping the circumferential surface of a disk cannot readily wrap the edge of its foot around the edge of a disk to obtain a substantial grip on the side face of a disk. Thin washers or spacers between disks, not showed in the drawings, can be mounted on the axle 130 between the disks to maintain spacing and reduce friction between the faces of adjacent disks. I anticipate that the SNAIL WHEEL will function as a barrier to snails which approach it from below or from the side, such as, for example, along the underside of surface 134 in FIG. 13. I anticipate that the SNAIL WHEEL also will function as a one-way gate to snails which are lured into crawling from an access surface, such as the top of surface 134 in FIG. 13, onto the top of a SNAIL WHEEL where the disk(s) bearing the snail will rotate downward with the snail when the snail releases its hindbody grip on the access surface, and the disk(s) will thereafter rotate counter to the snail's attempts to climb back up to the access surface.

Figure 14:
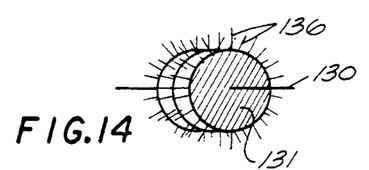
FIG. 14 is an embodiment of a variation of the SNAIL WHEEL barrier which incorporates a spike matrix on the wheel surface.
Figure 15:
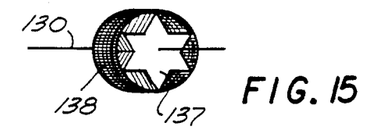
FIG. 15 is an embodiment of a variation of the Snail WHEEL barrier which incorporates a copper screen on the wheel surface.

Details 14 and 15 on Drawing Sheet 6/6 show alternate embodiments of the circumferential surfaces of the disks 131 in the Snail WHEEL barrier.

In Detail 14 the circumferential surface of the disk 131 is studded with points 136 forming a circumferential matrix that denies a snail's foot a continuous surface on which it may obtain a grip to suspend itself. The matrix of points will discourage a snail from attempting to suspend itself from a grip on the circumferential surface of the disk and the impairment of the snail's grip by the matrix of points will increase the likelihood that any snail which does obtain a grip will lose or surrender that grip to inertial force as the snail shifts its weight to the disk and accelerates through a downward curve when the disk rotates under the snail's weight.

Detail 15 shows a spoked wheel 137, in place of disk 131, rotatably mounted on axle 130. A copper wire screen 138 is circumferentially mounted like a tire on the spoked wheel 137 such that the copper wire screen is the circumferential surface presented for a snail's grip. In my conception the copper surface is aversive to a snail which may initially grip the screen surface long enough to shift its weight to the wheel and ride its downward rotation, but the copper surface in a short time will tend to elicit avoidance behavior from the snail which will surrender its grip on the screen and drop off the wheel.

An Embodiment of the SNAIL PUB and SNAIL SALT STRIP

Figure 16:
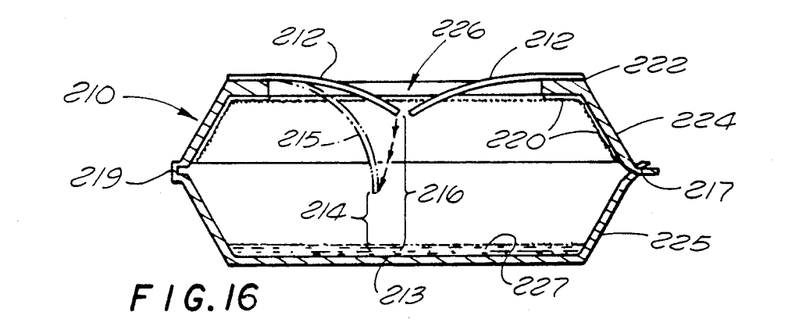
FIG. 16 is an elevation section view of an embodiment of the SNAIL PUB along line 16—16 of FIG. 17.
Figure 17:
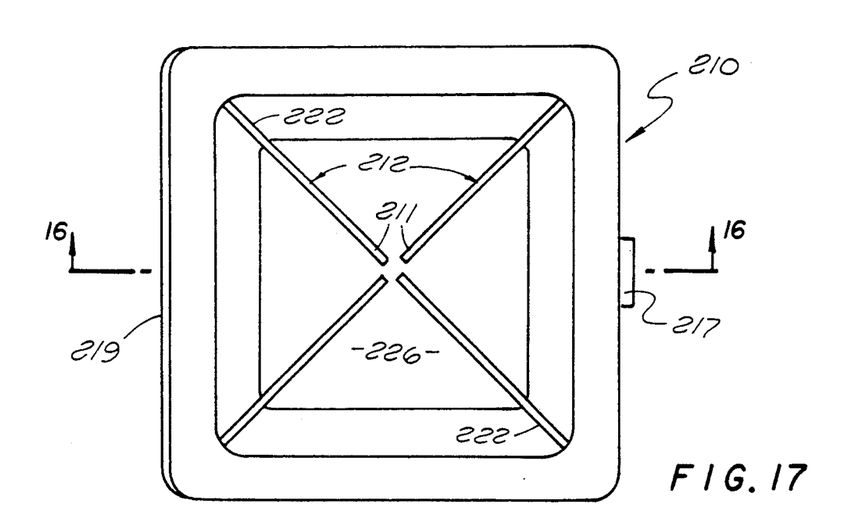
FIG. 17 is a plan view of an embodiment of the SNAIL PUB, including a fifth Embodiment of the ONE-WAY SNAIL GATE and SNAIL PEN, and an embodiment of the SNAIL SALT STRIP barrier.

FIGS. 16 and 17 show an embodiment of the SNAIL PUB which incorporates the SNAIL SALT STRIP. It is formed of a single unit 210 of polymer foam, such as polystyrene, comprising a top section 224 and a bottom section 225 hingably joined at 219 and having a locking tongue and slot 217. A plurality of fingers 212 formed of resilient monofilament polymer line (such as is used in fishing line) are attached at points 222 to the top section 224 of unit 210 to cantilever said fingers bearing access surface 211 out into the centrally framed opening 226 formed in the top section 224 of unit 210 so as to form extended gap 216 when unloaded. The monofilament line forming fingers 212 depresses downward under the weight of a snail to the position in dotted outline 215, forming minimum gap 214 with the target surface 213 on the floor of the bottom section 225 of unit 210. The snails attracted by the bait 227 traverse and depress resilient fingers 212 and access surface 211 to reach the bait at target surface 213. When the snails release their hindbody grip the unloaded fingers then flex upward to re-open extended gap 216 placing access surface 211 beyond the reach of snails remaining in bottom 225 of unit 210.

The inner walls and ceiling of upper section 224 of unit 210 are coated with a layer 220 of a snail-aversive salt embedded in adhesive such that bare salt crystals are exposed to the contact of any snail which touches the inner walls or ceiling of upper section 224. This is an application of the SNAIL SALT STRIP in a trap.

The bottom of the container will hold the fermenting sugar solution to serve as an attractant which is non-poisonous to humans, mammals and birds. Drowning of snails in the solution can be prevented by controlling the depth, or screening the solution.

Excessive contact with salts or their solutions will harm or kill snails, but snails will avoid such contact if given opportunity to do so. When used in a trap the salt barriers must be protected from water to avoid leaching of the salt into the fermenting bait solution, which may poison both the fermenting yeast and any snails which happen to be in the solution, unless, of course, it is desired to kill the snails. Normally the polymer foam exterior trap surfaces will shed water sufficiently to protect the salt barriers inside from rain or irrigation sprinkling.

Methods of Making and Using Gate Fingers

The fingers 12 of the ONE-WAY GATE in FIG. 2 can be positioned either with no initial gap between the cantilevered tips and the access surface, or with an initial minimum gap 14 not exceeding approximately the diameter of the shell of the smallest snail which is to be captured, measured longitudinally along the length of the snail's body.

The cantilevered fingers 12 are formed of a material which has sufficient stiffness to support its own cantilevered tip and to hold the tip in position when the snail reaches its forebody to contact and grip the finger tip. The cantilevered finger also must have sufficient flexibility that when the snail shifts its full weight to the cantilevered finger tip the tip will droop downward and away from the access surface to create an extended gap 16 between the finger tip and the access surface greater than that across which the snail can reach to contact and grip the access surface from the target surface.

The one-way gate will operate only once if the finger is flexible under the snail's weight, but lacks sufficient resilience, or other means, to return the finger to its original position adjacent to the access surface. Paperboard fingers approximately 0.1 centimeter thick, 0.5 centimeter wide and 18 centimeters long have functioned in this mode.

In order that the gate function repeatedly, it is desirable that the fingers possess sufficient resilience to return to the original position adjacent to the access surface, or that some spring or other mechanical device so return the fingers to their original position.

Resilient fingers of preferred mechanical properties have been formed of a sheet of paper, laminated on both sides with a polymer or plastic film, which I am informed and believe to be "Mylar" (Registered Trade Mark), heat-bonded to the paper with polypropylene. I am informed and believe that the lamination process uses two layers of plastic film, such as "Mylar", each approximately 1 mil to 8 mils thick (1 mil=one thousandth of an inch=0.0254 mm.) on which the bonding polypropylene is spread, the sheets of plastic film with the paper between them are then passed by a heating element and are bonded by compression between rollers while heated, and then cooled. The resulting material used for the resilient fingers had a thickness of approximately 3/128ths inch (0.6 mm), of which approximately 1/64th inch (0.4 mm) was the plastic laminate.

Functional, resilient fingers have been formed by lamination of 20 pound paper on both sides with a plastic film 3 mils (0.0762 mm) thick, which film I am informed and believe to be made of a polyester film and a heat sensitive adhesive layer, commercially available from General Binding Corporation, Northbrook, Ill. Functional, resilient fingers also have been made with 67 pound vellum paper laminated on both sides with such polyester plastic film 1.5 mils (0.0381 mm) thick.

The plastic-laminated paper fingers can absorb water where cuts are made through the plastic laminate in the course of forming the fingers, leading to a weakening or failure of the fingers if the trap is subjected to wetting by a rain or by irrigation. This water-induced weakening has been substantially reduced where the fingers after cutting were immersed in a bath of liquid silicone water repellent such as is used for waterproofing of leather (The John Lincoln Co, Sunnyvale Calif.), and then were air dried.

The resulting preferred properties of the gate fingers are: sufficient stiffness for the finger to hold itself in cantilevered position relative to the access surface and to provide the snail with sufficient forebody gripping surface to induce the snail to attempt to cross to the target surface at the tip of the finger; flexibility to rapidly accelerate downward along the curved path 38 away from the access surface under a snail's weight; resiliency to return to its original cantilevered position adjacent to the access surface when the weight of the snail is removed; sufficient tensile strength not to crack or fail under the acceleration and deceleration stresses; durability to survive a plurality of flexions; relatively inexpensive material cost; simple inexpensive cutting or die-stamping to form fingers; relatively slick target surface to aid snail-dropping as described; waterproof to survive damp outdoor conditions; and able to retain its stiffness sufficient to hold the cantilevered position under ambient outdoor temperatures. Such plastic-laminated paper fingers of 0.5 centimeters horizontal width, and from approximately 8 to 13 centimeters horizontal length measured longitudinally outward along the fingers from the support point in the cantilevered position, have functioned to open an adequate extended gap 16 between the finger tip and the access surface under the weight of snails of various sizes to serve as a one-way gate.

An essential characteristic of the flexible fingers is a threshold of transition from stiffness to flexibility under increasing loading of the target surface such that the finger tip bearing the target surface will hold a cantilevered position when loaded with not more than the initial gripping contact of the snail, but will flex downward when the snail shifts its full weight to the target surface and releases its stabilizing hindbody grip on the access surface. The threshold of flexibility and the degree of flexibility, hence the downward acceleration rate of the target surface bearing the snail, as well as the forebody gripping surface area presented to the snail at the tip of the finger, are readily adjustable in the cutting of the fingers.

Inexpensive fingers which are sufficiently functional for limited purposes can be formed of monofilament line such as is used for fishing line, which I am informed and believe is made from nylon, polystyrene or similar polymer material. The flexibility can be controlled by the length of the cantilevered portion and the test weight of the line. The monofilament line can be tapered to a smaller diameter at the cantilevered tip of the finger to improve the responsiveness of the finger tips to smaller gastropods, thus increasing the range of gastropod sizes which can use such tapered fingers.

The effectiveness of the gate can be improved by shading the fingers from direct sunlight to reduce the heating and softening of the finger material which will tend to make the fingers droop, and by providing the snails with access from the fingers to a collection area shaded from direct sunlight and kept moist so that the snails will prefer to crawl off the fingers and enter into and remain in the collection area thereby unloading the resilient fingers and allowing them to resume their position adjacent to the access surface for more snails to pass the one-way gate.

Variations on Gate Structure

I have conceived another version of the One-Way Gate, not depicted in a drawing, in which the target surface is on one end of a lever the other end of which lever is hingably connected to support means. The target surface is held in proximity to the access surface by spring means, rather than by resilience intrinsic to the fingers, such spring means being capable of being compressed by the snail's weight when the snail shifts its weight to the target surface and releases its hindbody grip on the access surface.

In another version, not depicted in the drawings, a pivoting lever could carry one surface, target or access, while a flexible finger carries the other. As a further alternative, the lesser-moment end 88 of the pivoting lever 85 could have a finger tip which has a threshold of transition between stiffness and flexibility as in the fingers 12, thus incorporating both flexibility and pivot action into the member bearing the target surface so that an extended gap 16 will open even for smaller snails, but the greater-moment end 87 of the lever 85 could be so weighted that the greater-moment end will be overbalanced and the lesser-moment end pivot downward only under the weight of larger snails.

In any embodiment, the snails can be led by the finger structure or attracted from the target surface to a container for collection. In the snail-dropping embodiments, the dropped snails can fall directly into the container. The collected snails can then be sealed into the container and the container removed for disposition.

The generic term "transition surface" as used herein means the species "access surface" and "target surface." The term "grippable surface" as used herein means a surface adapted to provide the snail or other creature opportunity for a sufficient hold on the surface to use that surface according to its intended function as an access or target surface.

What I claim is:

1. A one-way gate, for use with a creature having gastropodan, caterpillar-like, or similar means of locomotion, comprising:
   A. a surface grippable by a forebody grip of the creature, and
   B. movement means, which means
      I. is adapted
         (a) to bear said grippable surface thereon,
         (b) to permit placement thereof so that a grippable surface borne thereon is adjacent to a transition surface with a minimum gap between said grippable surface and the transition surface not exceeding the reach of a forebody grip of the creature from one of said surfaces to the other,
         (c) to be activatable by the creature's shift of its weight to a forebody grip across said minimum gap and release of any hindbody grip, and
      II. constitutes means for expanding said minimum gap into an extended gap exceeding the creature's reach for a new forebody grip for a return in the reverse direction across said extended gap; and
   c. wherein said movement means further comprises:
      A member having
      (i) a first end adapted to bear a grippable surface,
      (ii) a second end having a cantilever bearing surface, and
      (iii) resilience and a threshold of transition from stiffness to flexibility, under increasing loading of a grippable surface borne on said first end, adapting said member:
         (a) to cantilever its own first end, from said cantilever bearing surface on its second end, permitting placement of an unloaded grippable surface borne on said first end to form a minimum gap relative to a transition surface, and
         (b) to sustain such placement of such grippable surface on said first end without motion so great as to discourage a creature from obtaining a forebody grip thereon, and shifting its weight thereto, across said minimum gap; and
         (c) to pen said extended gap, when so cantilevered, upon loading by a creature's weight on such grippable surface on said first end, and
         (d) to restore such minimum gap, when so cantilevered, upon removal of a creature's weight from the cantilevered first end of said member.

2. A one-way gate, as recited in claim 1, wherein said member further comprises:
   A resilient member adapted to restore, when so cantilevered, said minimum gap upon the unloading of the cantilevered portion of said member of any creatures thereon.

3. A device, adapted to serve as movement means in a one-way gate, comprising:
 A. a lever having first and second ends and a pivot point therebetween, which lever
  (i) is adapted to permit the bearing of a grippable surface on said first end, and
  (ii) is adapted to permit placement of said lever so that a grippable surface so borne on said first end is adjacent to a transition surface with a minimum gap between said grippable and transition surfaces, and
  (iii) has moments, of said first and second ends relative to each other about said pivot point, adapting said lever to pivot the grippable surface borne on said first end (a) upward when the grippable surface is loaded with not more than an initial forebody gripping contact of a creature, and (b) downward when the grippable surface is loaded by a creature's shift of its weight to a forebody grip thereon; and
 B. said lever is adapted to permit pivotal mounting of said lever at said pivot point, and
 C. said lever is adapted to permit mounting of it in combination with stopping means for halting the upward pivot of an unloaded grippable surface borne on said first end at a level where the grippable surface forms a minimum gap relative to a transition surface.

4. A device adapted for use as movement means in a one-way gate, comprising: A member having
 A. a first end adapted to bear a grippable surface,
 B. a second end having a cantilever bearing surface, and
 C. resilience and a threshold of transition from stiffness to flexibility, under increasing loading of a grippable surface borne on said first end, adapting said member:
  (i) to cantilever its own first end, from said cantilever bearing surface on its second end, permitting placement of an unloaded grippable surface borne on said first end to form a minimum gap relative to a transition surface, and
  (ii) to sustain such placement of such grippable surface on said first end without motion so great as to discourage a creature from obtaining a forebody grip thereon, and shifting its weight thereto, across said minimum gap; and
  (iii) to open said extended gap, when so cantilevered, upon loading by a creature's weight on such grippable surface on said first end, and
  (iv) to restore such minimum gap, when so cantilevered, upon removal of a creature's weight from the cantilevered first end of said member.

5. A one-way gate for use with a creature having gastropodan, caterpillar-like, or similar means of locomotion, comprising:
 A. a surface grippable by a forebody grip of the creature, and
 B. movement means, which means
  I. is adapted
   (a) to bear said grippable surface thereon,
   (b) to permit placement thereof so that a grippable surface borne thereon is adjacent to a transition surface with a minimum gap between said grippable surface and the transition surface not exceeding the reach of a forebody grip of the creature from one of said surfaces to the other,
   (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap, and
  III. wherein said movement means further comprises: restoring means for expanding said minimum gap to restore said extended gap upon removal of the creature's weight from the grippable surface.

6. A trap, for use with a creature having gastropodan, caterpillar-like or similar locomotion, comprising:
 I. At least one one-way gate comprising
  A. a surface grippable by a forebody grip of the creature, and
  B. movement means for such grippable surface, which means
   (i) is adapted
    (a) to bear said grippable surface thereon,
    (b) to permit placement thereof with the grippable surface borne thereon adjacent to a transition surface to form a minimum gap between said grippable surface and the transition surface not exceeding the reach of a forebody grip of the creature from one of said surfaces to the other, and
    (c) to be activatable by the creature's shift of its weight across said minimum gap to a forebody grip on one of said surfaces and release of any hindbody grip on the other of said surfaces, and
   (ii) constitutes means for expanding said minimum gap into an extended gap exceeding the creature's reach for a new forebody grip for a return in the reverse direction across said extended gap; and
 II. isolation means for eliminating any escape surface which the creature can use as an exit route from said surface to which the creature has shifted its weight across said minimum gap.

7. A trap, as recited in claim 6, wherein said isolation means comprises:
 at least one filament
  A. adapted to bear the weight of said one-way gate plus the weight of any attractant and any creatures collected on said gate, and
  B. having a diameter sufficiently smaller than the width of the creature's foot to impair the creature's traction on said filament and thereby discourage the creature from crawling thereupon, and
  C. from which filament said one-way gate
   (i) is suspended in space to eliminate any escape surface other than said filament, and
   (ii) is placed with the grippable surface forming a minimum gap relative to a transition surface and with room for motion of the grippable surface permitting the extension of said minimum gap to said extended gap.

8. A trap, as recited in claim 6, wherein said isolation means comprises:

A. a support member bearing said one-way gate from which said one-way gate is placeable adjacent to a transition surface with said minimum gap between said transition surface and the grippable surface and with no barrier therebetween, and B. barrier means for closing all routes of escape from said surface to which the creature has shifted its weight across said gap.

9. A trap, as recited in claim 8, wherein said barrier means comprises:

a metallic copper surface which encircles said support member.

10. A trap, as recited in claim 9, wherein said barrier means further comprises a metallic copper surface positioned at a sufficiently vertical angle that a gastropod will slide or fall off of said surface.

11. A trap, as recited in claim 6, further comprising: At least one container adapted to receive the creature after it passes across said one-way gate.

12. A method of collecting snails, comprising:

A. placing in or near an area frequented by snails a trap, comprising any of those described in claims 6 through 11, inclusive, and B. luring snails into said trap with an attractant generated by an aqueous solution of sugar containing an actively growing yeast adapted to dissimilate said sugar solution.

13. A one-way gate, for use with a creature having gastropodan, caterpillar-like, or similar means of locomotion, comprising:

A. a surface grippable by a forebody grip of the creature, and

B. movement means, which means
  I. is adapted
    (a) to bear said grippable surface thereon,
    (b) to permit placement thereof so that a grippable surface borne thereon is adjacent to a transition surface with a minimum gap between said grippable surface and the transition surface not exceeding the reach of a forebody grip of the creature from one of said surfaces to the other,
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap, and C. means for dislodging the creature's grip from the grippable surface after the creature transfers its weight to its forebody grip on the grippable surface.

14. A method of making fingers to serve as movement means for a one-way gate, for use with a creature having gastropodan, caterpillar-like, or similar means of locomotion, said gate comprised of A. a surface grippable by a forebody grip of the creature, and B. movement means, which means
  I. is adapted
    (a) to bear said grippable surface thereon,
    (b) to permit placement thereof so that a grippable surface borne thereon is adjacent to a transition surface with a minimum gap between said grippable surface and the transition surface not exceeding the reach of a forebody grip of the creature from one of said surfaces to the other,
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap, said method further comprising:

A. laminating paper with resilient polymer,

B. forming fingers, adapted to serve as movement means in a one-way gate, in said laminated paper.

15. A method of making fingers for a one-way snail gate, as recited in claim 14, further comprising:

Waterproofing said fingers where the forming method has pierced the polymer and exposed the paper by saturating said formed fingers with liquid silicone solution and drying said saturated formed fingers.

16. A snail collection system comprising:

A. an access surface,

B. one way gate means placed adjacent to said access surface to form an initial minimum gap and capable of expanding into an expanded gap under the weight of a snail that crosses said one-way gate, C. isolation means for eliminating any escape surface which the snails can use as an exit route from said one way gate means to which the creature has shifted its weight across said minimum gap, D. container means into which the snails can pass after crossing said one-way gate, E. barrier means for preventing escape of snails from the container, and F. attraction means for luring snails onto the access surface and across said one-way gate.

17. A method of making fingers for a one-way gate, for use with a creature having gastropodan, caterpillar-like, or similar means of locomotion, said gate comprised of A. a surface grippable by a forebody grip of the creature, and B. movement means, which means
  I. is adapted
    (a) to bear said grippable surface thereon,
    (b) to permit placement thereof so that a grippable surface borne thereon is adjacent to a transition surface with a minimum gap between said grippable surface and the transition surface not exceeding the reach of a forebody grip of the creature from one of said surfaces to the other,
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap, said method further comprising:

forming finger means, adapted to serve as movement means in a one-way gate, from resilient monofilament line having a sufficiently large diameter to permit the creature to obtain a grip thereon.

18. A device adapted for use as movement means in a one-way gate, comprising:

A member having
- A. a first end adapted to bear a grippable surface,
- B. a second end having a cantilever bearing surface, and
- C. resilience and a threshold of transition from stiffness to flexibility, under increasing loading of a grippable surface borne on said first end, adapting said member:
  - (i) to cantilever its own first end, from said cantilever bearing surface on its second end, permitting placement of an unloaded grippable surface borne on said first end to form an extended gap relative to a transition surface, and
  - (ii) to close said extended gap to form a minimum gap, when so cantilevered, upon loading by a creature's weight on such grippable surface on said first end, and
  - (iii) to restore such extended gap, when so cantilevered, upon removal of a creature's weight from the cantilevered first end of said member.

19. A one-way gate, for use with a creature having gastropodan, caterpillar-like, or similar means of locomotion, comprising:

A. a surface grippable by a forebody grip of the creature, and

B. movement means, which means
  I. is adapted
    (a) to bear said grippable surface thereon,
    (b) to permit placement thereof so that a grippable surface borne thereon is adjacent to a transition surface with a minimum gap between said grippable surface and the transition surface not exceeding the reach of a forebody grip of the creature from one of said surfaces to the other,
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap, and C. wherein said movement means further comprises:
A member having
  (i) a first end adapted to bear a grippable surface,
  (ii) a second end having a cantilever bearing surface, and
  (iii) resilience and a threshold of transition from stiffness to flexibility, under increasing loading of a grippable surface borne on said first end, adapting said member:
    (a) to cantilever its own first end, from said cantilever bearing surface on its second end, permitting placement of an unloaded grippable surface borne on said first end to form an extended gap relative to a transition surface, and
    (b) to close said extended gap, when so cantilevered, to form a minimum gap upon loading by a creature's weight on such grippable surface on said first end, and
    (c) to restore such extended gap, when so cantilevered, upon removal of a creature's weight from the cantilevered first end of said member.

20. A one-way gate, as recited in claim 19, wherein said member further comprises:

A resilient member adapted to restore, when so cantilevered, said extended gap upon the unloading of the cantilevered portion of said member of any creatures thereon.

21. A one-way gate, for use with a creature having gastropodan, caterpillar-like, or similar means of locomotion, comprising:

A. a surface grippable by a forebody grip of the creature, and

B. movement means, which means
  I. is adapted
    (a) to bear said grippable surface thereon,
    (b) to permit placement thereof with a grippable surface borne thereon adjacent to a transition surface to form a minimum gap between said grippable surface and the transition surface not exceeding the reach of a forebody grip of the creature from one of said surfaces to the other, and
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap; and C. Means for dislodging the creature's grip from the grippable surface after the creature transfers its weight to its forebody grip on the grippable surface, and D. foot both means placed across the creature's path to the minimum gap and adapted to hold water to wet the gripping parts of a creature's foot.

22. A one way gate, for use with a creature having gastropodan, caterpillar-like, or similar means of locomotion, comprising:

A. a surface grippable by a forebody grip of the creature, and

B. movement means, which means
  I. is adapted
    (a) to bear said grippable surface thereon,
    (b) to permit placement thereof with a grippable surface borne thereon adjacent to a transition surface to form a minimum gap between said grippable surface and the transition surface not exceeding the reach of a forebody grip of the creature from one of said surfaces to the other, and
    (c) to be activatable by the creature's shift of its weight to a forebody grip across said minimum gap and release of any hindbody grip, and
  II. constitutes means for expanding said minimum gap into an extended gap exceeding the creature's reach for a new forebody grip for a return in the reverse direction across said extended gap; and C. said movement means further comprises:
  I. a member having
    (i) a first end adapted to bear a grippable surface,
    (ii) a second end having a cantilever bearing surface, and (iii) resilience and a threshold of transition from stiffness to flexibility, under increasing loading of a grippable surface borne on said first end, adapting said member:

(a) to cantilever its own first end, from said cantilever bearing site on its second end, permitting placement of an unloaded grippable surface borne on said first end to form a minimum gap relative to a transition surface, and     (b) to sustain such placement of such grippable surface on said first end without motion so great as to discourage a creature from obtaining a forebody grip thereon, and shifting its weight thereto, across said minimum gap; and     (c) to open said extended gap, when so cantilevered, upon loading by a creature's weight on such grippable surface on said first end, and     (d) to restore such minimum gap, when so cantilevered, upon removal of a creature's weight from the cantilevered first end of said member; and D. means for supporting cantilever of said member, and E. means for adjustably mounting the second end of said member on said cantilever supporting means permitting said cantilever bearing surface on said second end to be shifted along said member to extend or reduce the cantilevered portion of said member.

23. A one-way gate, for use with a creature having gastropodan, caterpillar-like, or similar means of locomotion, comprising:

A. a surface grippable by a forebody grip of the creature, and

B. movement means, which means

I. is adapted

(a) to bear said grippable surface thereon,         (b) to permit placement thereof with a grippable surface borne thereon adjacent to a transition surface to form a minimum gap between said grippable surface and the transition surface not exceeding the reach of a forebody grip of the creature from one of said surfaces to the other, and         (c) to be activatable by the creature's shift of its weight to a forebody grip across said minimum gap and release of any hindbody grip, and     II. constitutes means for expanding said minimum gap into an extended gap exceeding the creature's reach for a new forebody grip for a return in the reverse direction across said extended gap; and D. means for adjustably mounting a transition surface adjacent to said grippable surface to permit adjustment of said minimum gap between said surfaces.

24. A device for controlling creatures having gastropodan, caterpillar-like or similar means of locomotion, comprising:

(i) At least one one-way gate comprising:

A. a surface grippable by a forebody grip of the creature, and     B. movement means, which means         I. is adapted             (a) to bear said grippable surface thereon,             (b) to permit placement thereof with a grippable surface borne thereon adjacent to a transition surface to form a minimum gap between said grippable surface and the transition surface not exceeding the reach of a forebody grip of the creature from one of said surfaces to the other, and             (c) to be activatable by the creature's shift of its weight to a forebody grip across said minimum gap and release of any hindbody grip, and         II. constitutes means for expanding said minimum gap into an extended gap exceeding the creature's reach for a new forebody grip for a return in the reverse direction across said extended gap; and (ii) isolation means for eliminating any escape surface which the creature can use as an exit route from said surface to which the creature has shifted its weight across said minimum gap; and (iii) a container open at the top, (iv) an enclosing top for said container further comprising     (A) an access surface having an upper side, a lower side, and an inner lip,     (B) suspension means for positioning at least one of said one-way gates within said top adjacent to said inner lip of said access surface to form said initial minimum gap between the access surface and said one-way gates, and (v) barrier means to bar gastropods from escaping around the inner lip to the upper side of said top.

* * * * *